(12) United States Patent
Balcerzak et al.

(10) Patent No.: US 8,881,645 B2
(45) Date of Patent: Nov. 11, 2014

(54) BARBECUE SUPPORT ASSEMBLY

(75) Inventors: Stephen Balcerzak, Waterloo (CA);
Walter Grassi, Burlington (CA)

(73) Assignee: Weber-Stephen Products LLC,
Palatine, IL (US)

( * ) Notice: Subject to any disclaimer, the term of this patent is extended or adjusted under 35 U.S.C. 154(b) by 184 days.

(21) Appl. No.: 12/889,891

(22) Filed: Sep. 24, 2010

(65) Prior Publication Data

US 2014/0230665 A1    Aug. 21, 2014

Related U.S. Application Data

(60) Provisional application No. 61/245,775, filed on Sep. 25, 2009.

(51) Int. Cl.
*A47J 37/04*   (2006.01)
*A47J 37/06*   (2006.01)
*A47J 43/18*   (2006.01)
*A47J 37/07*   (2006.01)

(52) U.S. Cl.
USPC ...... 99/421 R; 99/419; 99/421 H; 99/421 HV

(58) Field of Classification Search
USPC .............. 99/419, 421, 359, 449, 441, 450, 99/421 HV, 421 HH, 421 H, 421 R; 211/74, 211/125, 14, 71.01; 219/450.1, 525
See application file for complete search history.

(56) References Cited

U.S. PATENT DOCUMENTS

| | | | |
|---|---|---|---|
| 3,169,470 A | 2/1965 | Oatley | |
| 3,309,982 A * | 3/1967 | Surks | 99/420 |
| 3,481,267 A | 12/1969 | Saiki | |
| 3,590,726 A * | 7/1971 | Warner | 99/339 |
| 4,324,174 A | 4/1982 | Conradt | |
| 4,413,609 A | 11/1983 | Tisdale | |
| 4,488,535 A | 12/1984 | Johnson | |
| 4,559,869 A * | 12/1985 | Hogan | 99/426 |
| 4,598,690 A * | 7/1986 | Hsu | 126/25 R |
| 4,724,753 A * | 2/1988 | Neyman et al. | 99/339 |
| 4,932,390 A | 6/1990 | Ceravolo | |
| 4,979,437 A | 12/1990 | Giebel | |
| 5,085,203 A | 2/1992 | Jette | |
| 5,105,726 A * | 4/1992 | Lisker | 99/340 |
| 5,419,249 A | 5/1995 | Papandrea | |
| 5,518,127 A * | 5/1996 | Warmack et al. | 211/193 |
| 5,650,085 A * | 7/1997 | Chen | 219/732 |
| 5,927,267 A | 7/1999 | McKenzie | |
| 6,142,140 A | 11/2000 | Shumaker | |
| 6,308,616 B1 | 10/2001 | Johnson | |
| 6,439,109 B1 | 8/2002 | Rehill | |
| 6,474,224 B1 | 11/2002 | Natter | |
| 6,640,797 B1 | 11/2003 | Magers | |
| 7,000,529 B2 | 2/2006 | Sculuca | |
| 7,040,219 B1 | 5/2006 | D'Amato | |
| 7,281,469 B1 | 10/2007 | Barbour | |
| 2003/0051607 A1 | 3/2003 | Cassell | |
| 2005/0257693 A1* | 11/2005 | Tschetter et al. | 99/419 |
| 2006/0124567 A1 | 6/2006 | Bove | |
| 2007/0151465 A1* | 7/2007 | Sculuca | 99/419 |
| 2008/0053425 A1 | 3/2008 | Stuhlmacher | |
| 2011/0113974 A1 | 5/2011 | D'Amato | |

* cited by examiner

*Primary Examiner* — Henry Yuen
*Assistant Examiner* — Michael Laflame, Jr.
(74) *Attorney, Agent, or Firm* — Niro, Haller & Niro

(57) ABSTRACT

A barbecue support assembly for supporting an elongate skewer at one or more preselected heights above a barbecue grill. The barbecue support assembly includes one or more body elements having one or more parts thereof positionable substantially at one of the preselected heights. Also the part includes one or more apertures in which an end of the skewer is receivable.

9 Claims, 11 Drawing Sheets

BARBECUE SUPPORT ASSEMBLY

This application claims the benefit of U.S. Provisional Patent Application No. 61/245,775, filed Sep. 25, 2009, and incorporates such provisional application in its entirety by reference.

FIELD OF THE INVENTION

The present invention is a barbecue support assembly for supporting an element at one or more preselected heights above a barbecue grill.

BACKGROUND OF THE INVENTION

In typical barbecues, the grill is generally flat, being defined by ribs which are spaced apart and substantially parallel. The barbecue unit also typically includes a warming rack which is positioned a distance above the grill, when the barbecue unit's hood is opened.

In conventional barbecues, the food to be cooked can be positioned therein only according to a limited number of options. For example, on the grill, the position of the food items may be changed (i.e., laterally or inwardly, or both) for exposure to more or less heat, as required. Once cooked, the food may be positioned on the warming rack, where the food is held sufficiently far away from the heat that it is warmed, with minimal further cooking thereof.

However, different types of food require different arrangements for cooking it, and the limited options available in known barbecues are sometimes inadequate. For instance, a shish kebab should be positioned relatively close to heat for cooking, but not so close as to char or blacken the food.

SUMMARY OF THE INVENTION

For the foregoing reasons, there is a need for a barbecue support assembly which addresses or mitigates one or more of the disadvantages of the prior art.

In its broad aspect, the invention provides a barbecue support assembly for supporting an elongate skewer at one or more preselected heights above a barbecue grill. The barbecue support assembly includes one or more body elements with one or more parts thereof positionable substantially at the preselected height. Also, each part includes one or more apertures in which an end of the skewer is receivable.

In another aspect, each aperture extends transversely to permit the skewer to be repositioned transversely relative to the barbecue grill.

In yet another aspect, the body element comprises a number of parts positioned at a number of preselected heights above the barbecue grill.

BRIEF DESCRIPTION OF THE DRAWINGS

The invention will be better understood with reference to the attached drawings, in which.

DETAILED DESCRIPTION

Figure 1A:
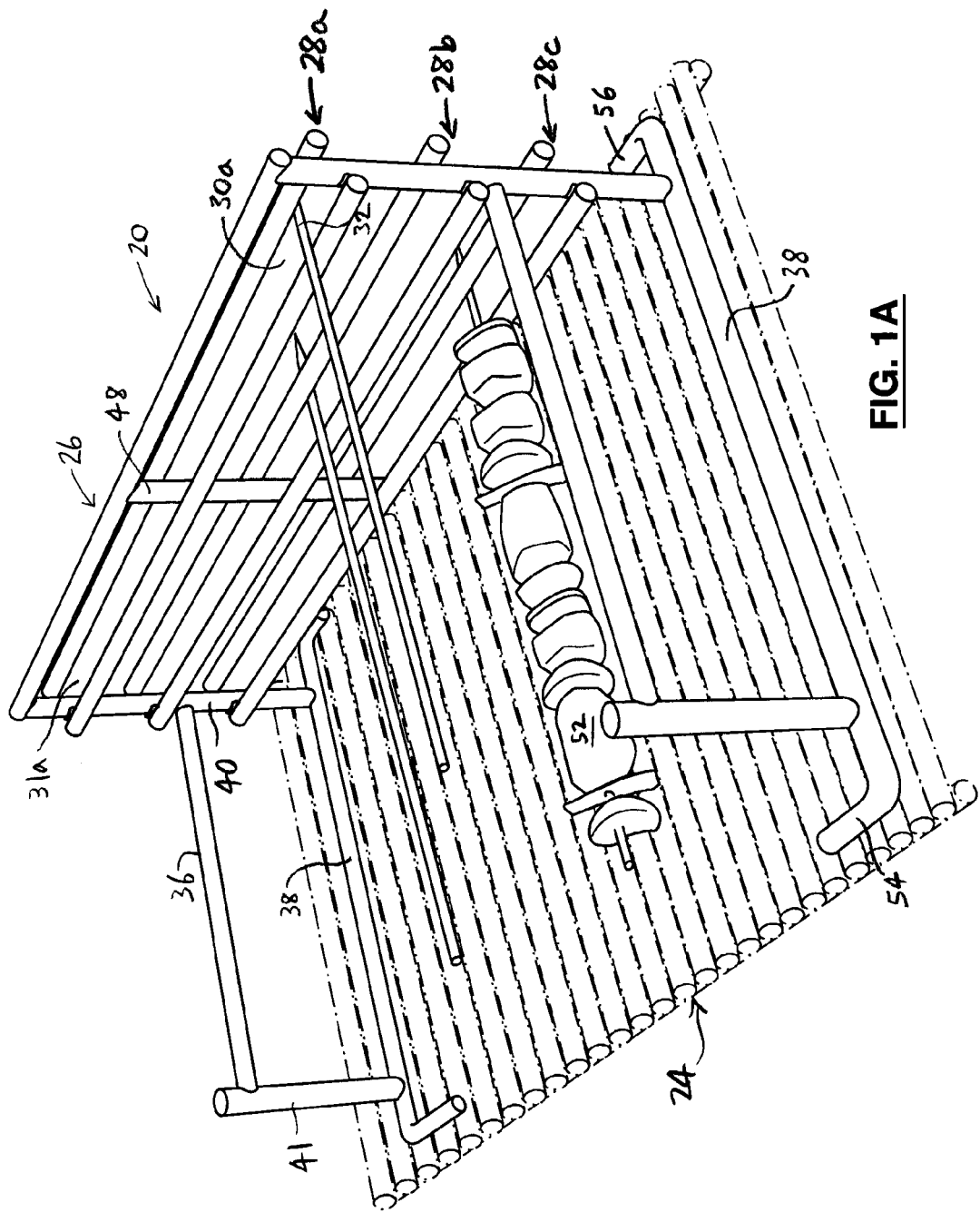
FIG. 1A is an isometric view of an embodiment of the barbecue support assembly of the invention.
Figure 1B:
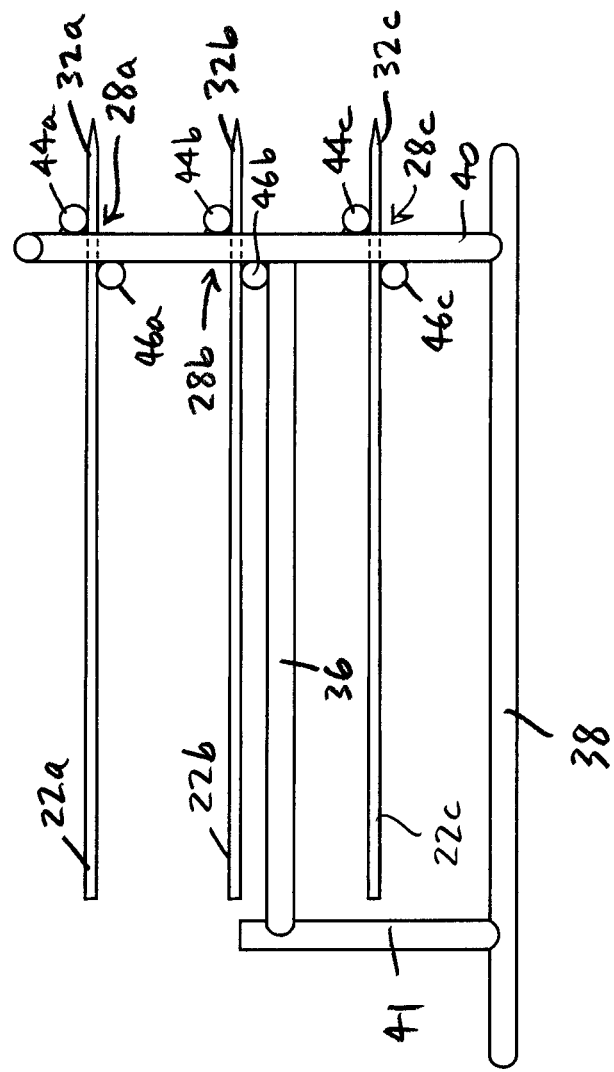
FIG. 1B is a side view of the barbecue support assembly of FIG. 1A.

Reference is first made to FIGS. 1A and 1B to describe an embodiment of a barbecue support assembly in accordance with the invention indicated generally by the numeral 20. The barbecue support assembly 20 is for supporting an elongate skewer 22 at one or more preselected heights above a barbecue grill 24 (FIGS. 1A and 1B). Preferably, the barbecue support assembly 20 includes one or more body elements 26 with one or more parts 28 thereof positionable substantially at the preselected heights above the grill 24, as will be described. As can be seen in FIG. 1A, each part 28 preferably includes one or more apertures 30 in which an end 32 of the skewer 22 is receivable.

In one embodiment, the barbecue support assembly 20 preferably includes a frame 34 for supporting the body element 26 above the grill 24. The frame 34 preferably includes upper and lower legs 36, 38, and inner and outer uprights 40, 41. Preferably, the upper and lower legs 36, 38 are attached to the inner and outer uprights 40, 41, and the parts 28 are also connected to the inner uprights 40. As can be seen in FIG. 1A, each part 28 preferably includes first and second portions 44, 46.

For ease of identification, three parts 28a, 28b, and 28c are identified in FIGS. 1A and 1B. It will be understood that, in the embodiment shown in FIGS. 1A and 1B, the first and second portions 44, 46 in each part 28 are the upper and lower bars respectively which define apertures therebetween. In addition, the barbecue support assembly 20 preferably includes an intermediate upright 48, to provide structural strength. For clarity, the apertures on both sides of the upright 48 are identified as apertures 30, 31 respectively (FIG. 1A). For example, in the part 28a, the first and second portions 44a, 46a are the upper and lower bars defining the apertures 30a, 31a therebetween.

Those skilled in the art will appreciate that the barbecue support assembly 20 may be formed of a variety of materials, which may be attached together or otherwise made into the barbecue support assembly in various ways. For example, the body element may be a substantially solid sheet of material with apertures therein (for receiving the ends of the skewers)

spaced apart to provide the desired horizontal and vertical spacing from each other, when the body element is in the operational (i.e., substantially vertical) position.

As another example, and as illustrated in FIG. 1A, the barbecue support assembly may be made of steel bars, welded or otherwise secured together. It has been found that steel bars approximately ¼ inch in diameter are suitable for the horizontal members, and steel bars approximately ⁷⁄₁₆ inch in diameter are suitable for the vertical members.

In the embodiment illustrated in FIGS. 1A and 1B, the upper and lower bars 44a, 46a (and also the corresponding upper and lower bars of the parts 28b, 28c) preferably are vertically offset relative to each other. In particular, the upper and lower bars 44, 46 of each part 28 are positioned on opposite sides of the upright members 40. As can be seen in FIG. 1B, the skewer preferably is inserted above the lower bar 46a, but below the lower bar 44a. Because the upper and lower bars 44, 46 are offset, the end of the skewer is securely held in the aperture. The vertical distance between the upper and lower bars is sufficient to enable a user (not shown) to position the end 32 of the skewer therebetween relatively easily.

In use, the user inserts the end 32 of the skewer 22 into the aperture 30. In FIG. 1A, the skewers inserted into apertures in the parts 28a, 28b, and 28c are identified as 22a, 22b, and 22c respectively for clarity. (Food 52 is shown only on the skewer 22c, to simplify the illustration. It will be understood that food preferably is also present on the skewers 22a and 22b when they are in use.) When the end 32a of the skewer 22a is inserted into one of the apertures 30a, 31a, food 52 on the skewer 22a is held at a first preselected height above the grill 24.

Similarly, when the respective ends 32b, 32c of the skewers 22b, 22c are inserted into apertures 30b, 30c, the food on the skewers 22b, 22c is held at second and third preselected heights above the grill respectively. The skewers may be positioned and repositioned vertically as required for cooking the food thereon.

Preferably, and as can be seen in FIG. 1A, each aperture 30, 31 extends transversely relative to the barbecue grill 24. For instance, the user may move the skewer 22a to the right or left (as presented in FIG. 1A), with the end 32a thereof in the aperture 30a or the aperture 31a, as the case may be, in order to expose the food thereon to less or to more heat, as required by the user. Alternatively, the user may move the skewer transversely in order to allow the user to have easy access to another food item (not shown) on the grill 24.

As noted above, vertical movement of the skewer relative to the grill 24 is possible. The parts 28a, 28b, and 28c are positioned at a number of preselected heights respectively, to permit the skewers to be repositioned vertically by the user, as desired. Accordingly, the positioning of the parts 28 vertically relative to each other and the grill (i.e., when the assembly 20 is positioned on the grill) permits the user to reposition skewers vertically, as the user requires. For example, after a skewer has been positioned in a lower part and the food thereon has been cooked, the user may wish to move the skewer to a higher part, so that the food thereon is only warmed.

Preferably, the lower leg 38 includes one or more transverse portions 54, 56 which are positionable transverse to the ribs of the barbecue grill 24, to stabilize the support assembly 20. The configuration of the barbecue support assembly 20 illustrated in FIG. 1A is advantageous because it an be used in an existing barbecue unit.

From the foregoing, it can be seen that the invention provides for multi-level cooking simultaneously, which effectively multiplies the available cooking area. Also, food items may be cooked (e.g., while on a skewer) without the food item touching a hot cooking surface (e.g., the grill), so that fatty foods (e.g., chicken wings), are less likely to be charred, or burst into flames while cooking. Also, less cleaning is required, as only the skewer needs to be cleaned after use. Flare-ups from the heat source generally have minimal effect on the cooking, because the food is positioned at a height above the grill surface. The skewers preferably are relatively easy to rotate, and the invention may be used with virtually any skewer.

Additional embodiments of the invention are shown in FIGS. 2A-8. In FIGS. 2A-8, elements are numbered so as to correspond to like elements in FIGS. 1A and 1B.

Figure 2A:
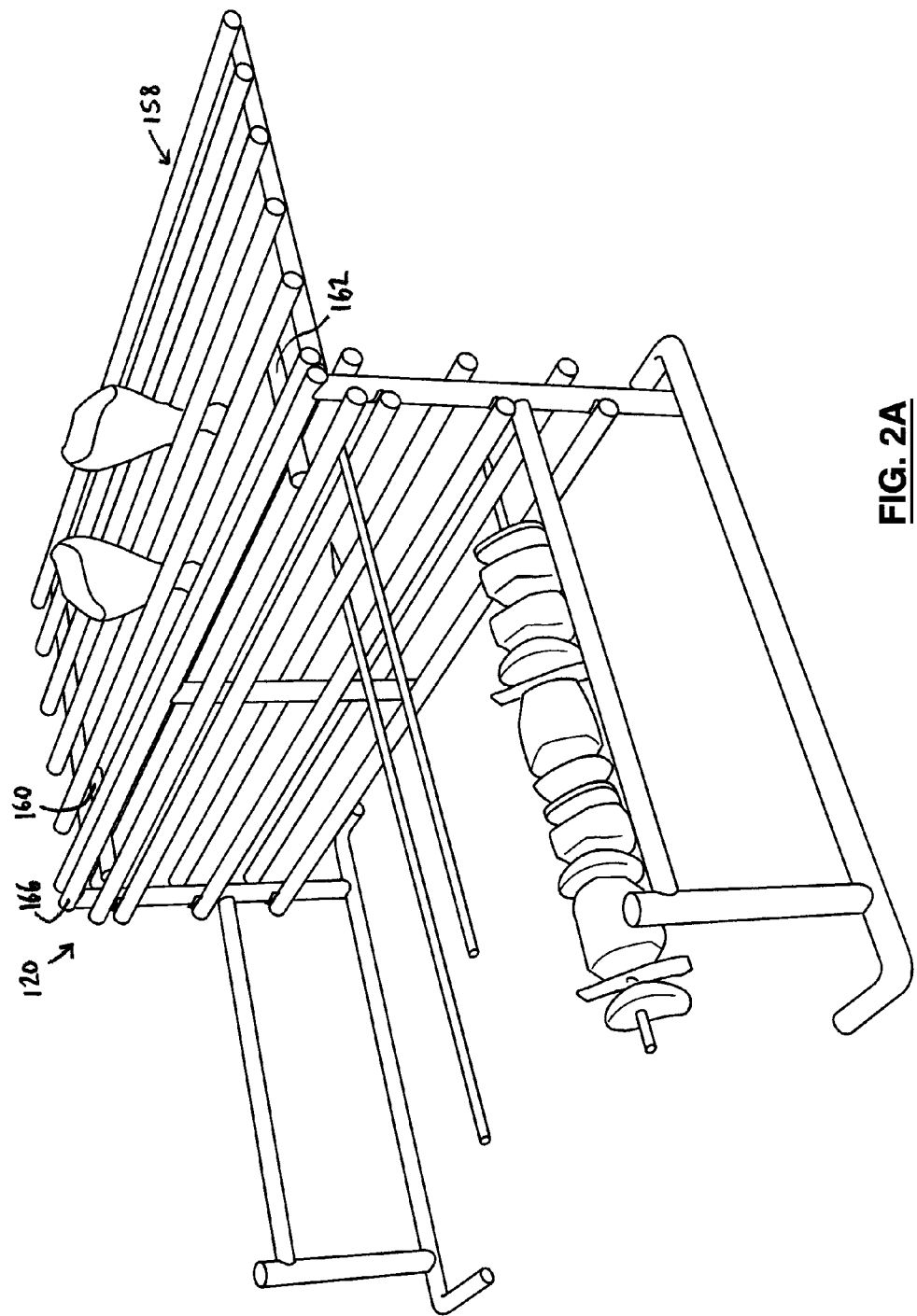
FIG. 2A is an isometric view of another embodiment of the barbecue support assembly of the invention.
Figure 2B:
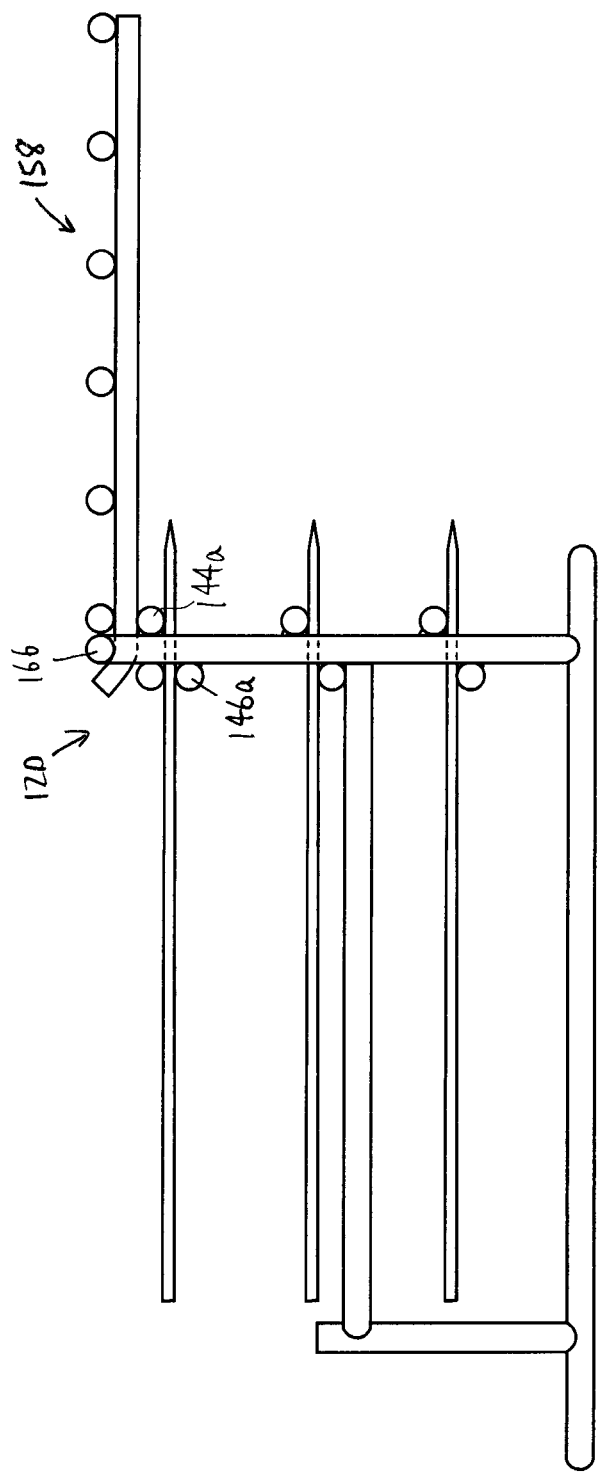
FIG. 2B is a side view of the barbecue support assembly of FIG. 2A.

Another embodiment of a barbecue support assembly 120 of the invention is shown in FIGS. 2A and 2B. The assembly 120 preferably includes a warming rack 158, which includes prongs 160, 162 receivable in a slot defined between the part 128a and an upper member 166 of the body element 126 (FIG. 2B).

Figure 2C:
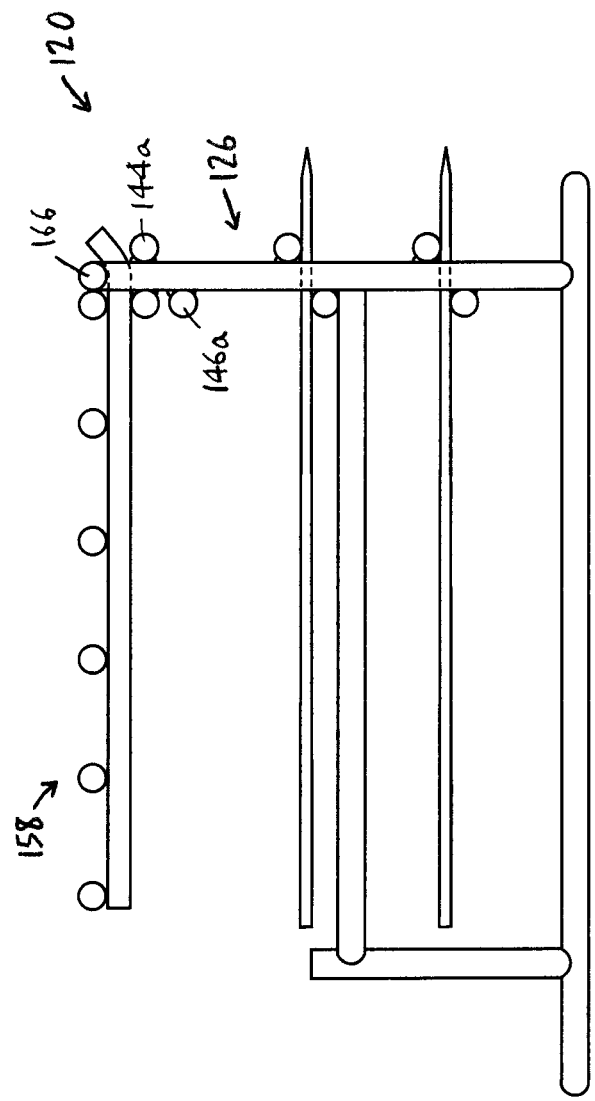
FIG. 2C is a side view of another alternative embodiment of the barbecue support assembly of the invention.

In an alternative arrangement illustrated in FIG. 2C, the warming rack 158 may be positioned in front of the body element 126. The prongs 160, 162 are inserted in the slot, directed toward the inner side of the body element (i.e., from front to back), in order to position the warming rack in front of the body element 126.

Figure 2D:
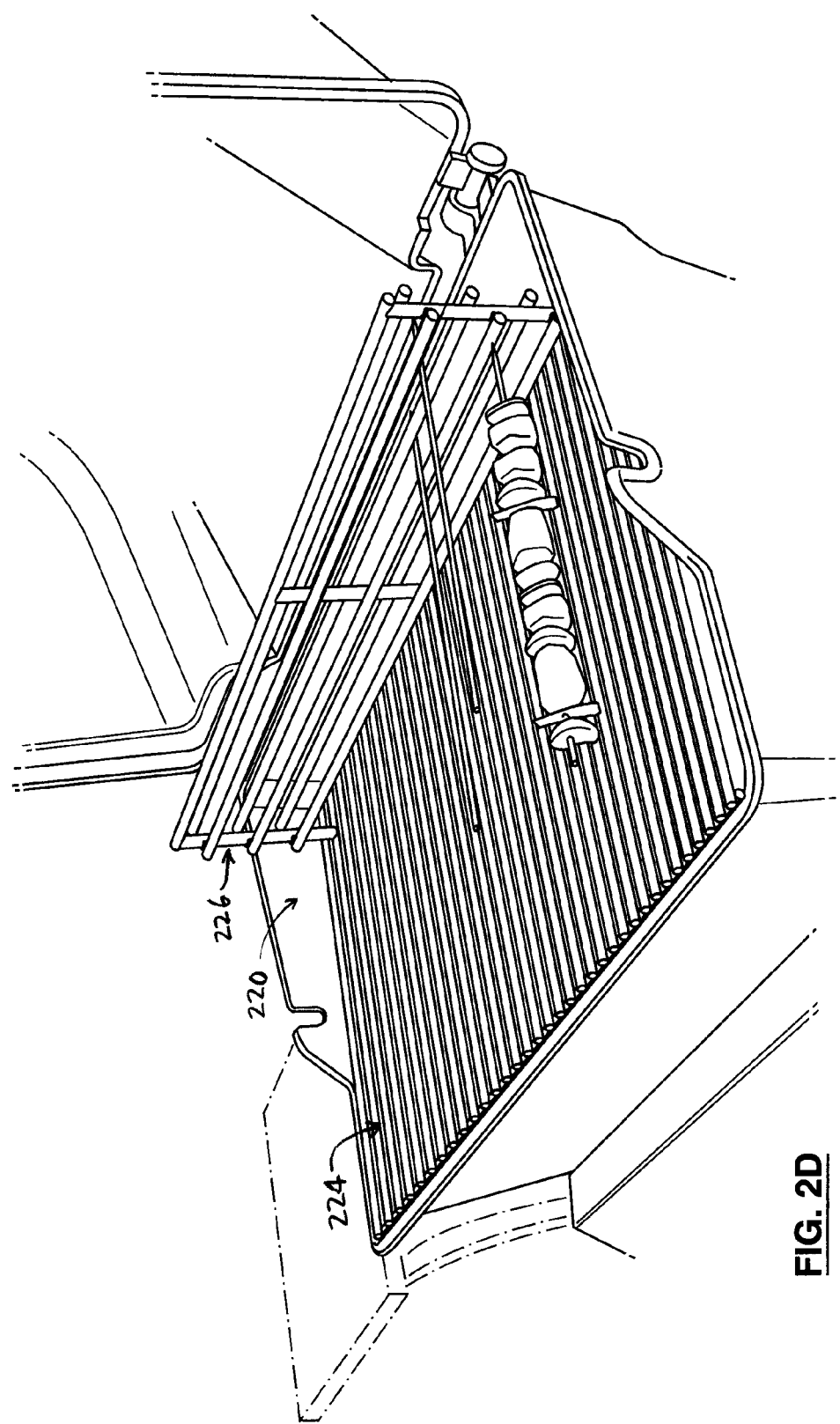
FIG. 2D is an isometric view of another embodiment of the barbecue support assembly of the invention.
Figure 3:
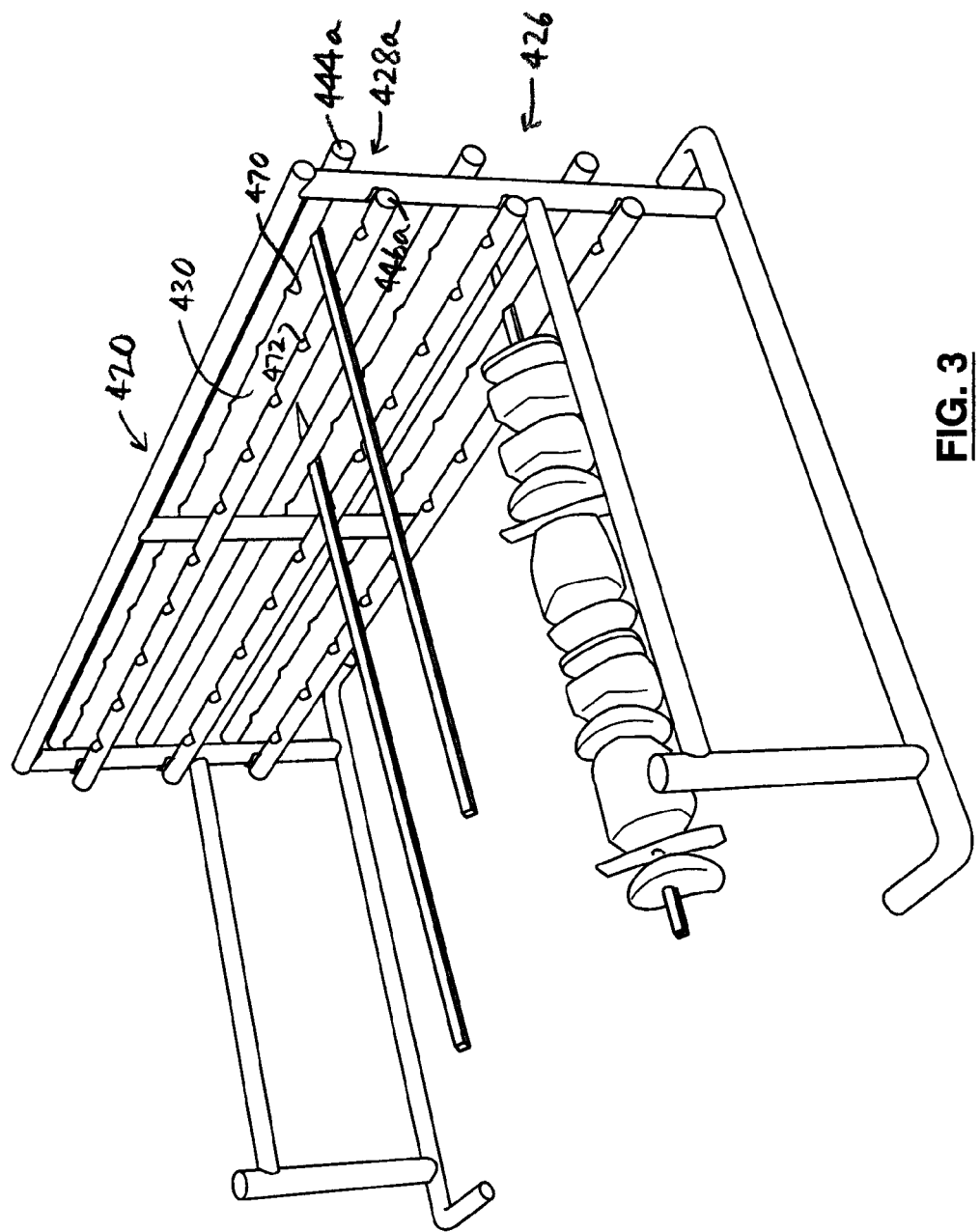
FIG. 3 is an isometric view of another alternative embodiment of the barbecue support assembly of the invention.

Another embodiment of the barbecue support assembly 220 is shown in FIG. 2D. In this embodiment, the body element 226 is attached to or otherwise formed with the barbecue grill 224 to form the barbecue support assembly 220.

Figure 4B:
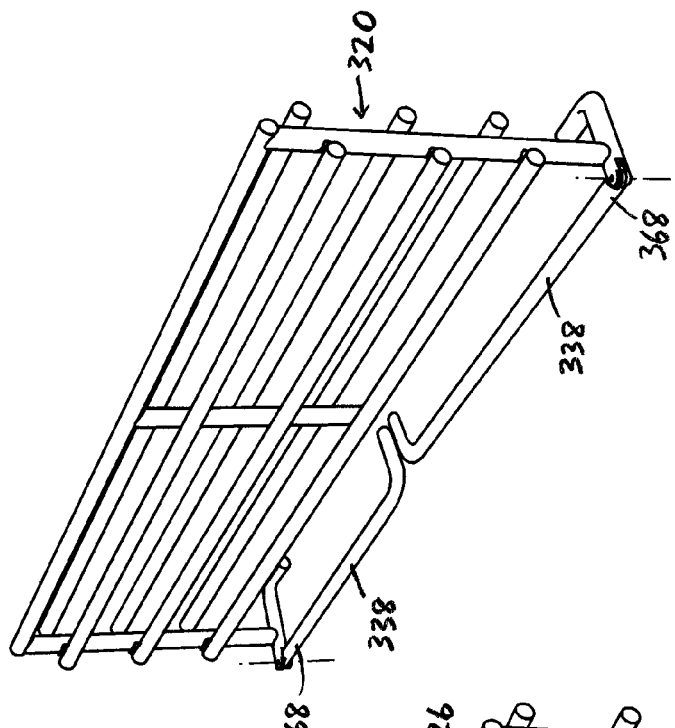
FIG. 4B is an isometric view of the barbecue support assembly of FIG. 4A with the hinged legs thereof in a closed condition.
Figure 4A:
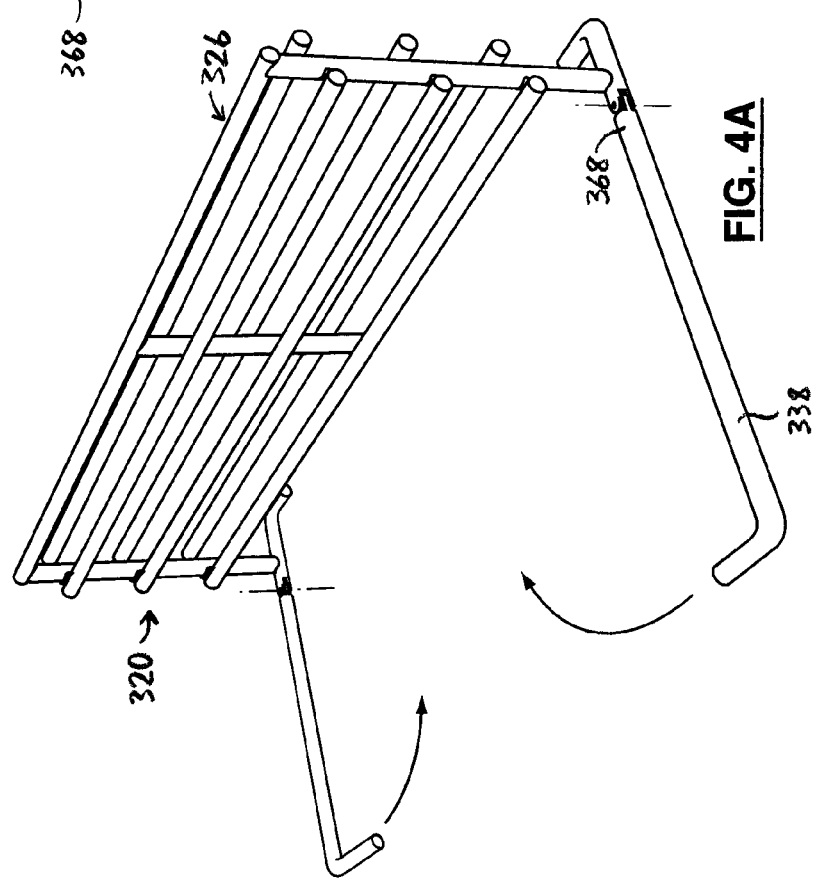
FIG. 4A is an isometric view of another embodiment of the barbecue support assembly of the invention, with hinged legs thereof in an open condition.

FIGS. 4A and 4B illustrate another embodiment of the invention. The barbecue support assembly 320 preferably includes movable lower legs 338 which are pivotably mounted to the body element 326 at inner ends 368 thereof. The legs 338 preferably are movable between an open position (FIG. 4A), in which the legs 338 are positioned to support the body element 326, and a closed position (FIG. 4B), in which the legs are folded, e.g., for storage.

Various features may be included in the barbecue support assembly for holding the skewer more firmly in the aperture. In the barbecue support assembly 420 shown in FIG. 3, for instance, notches 470, 472 are formed in the first and second portions 444, 446 respectively in which the ends 32 of the skewers are receivable. Preferably, each of the notches 470, 472 is substantially aligned with another such notch to define a relatively small aperture 430 in which the end of the skewer is receivable. Because the aperture 430 is relatively small, the skewer's end fits relatively securely therein.

Figure 5A:
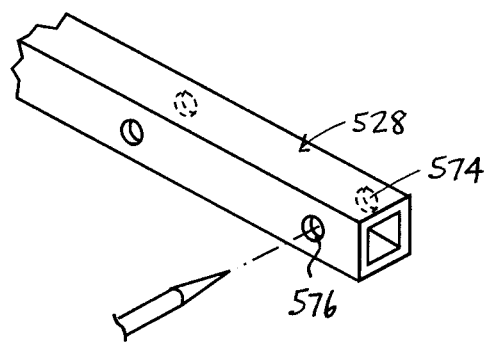
FIG. 5A is an isometric view of a portion of another embodiment of the barbecue support assembly of the invention, drawn at a larger scale.
Figure 5B:
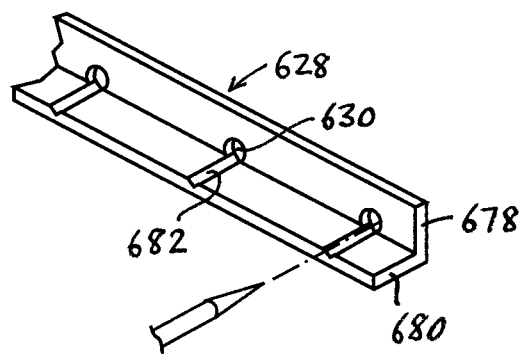
FIG. 5B is an isometric view of a portion of another embodiment of the invention.
Figure 5C:
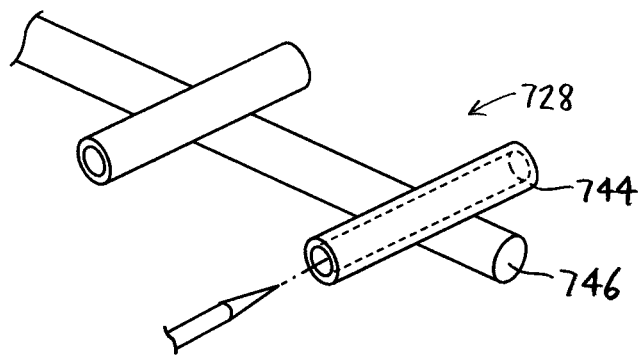
FIG. 5C is an isometric view of a portion of another embodiment of the invention.

Other embodiments are shown in FIGS. 5A-5C in which relatively small apertures are defined for receiving the end of the skewer. For instance, FIG. 5A discloses a part 528 with two apertures 574, 576 which are substantially horizontally aligned. The apertures 574, 576 are relatively small, and when the end is positioned therein, the end is held relatively securely.

FIG. 5B discloses a part 628 including a wall 678 and a flange 680. Preferably, an aperture 630 is located in the wall 678, and a groove 682 is formed in the flange 680, substantially aligned with the aperture 630, for supporting the skewer when the end is positioned in the aperture 630.

Another embodiment of the part 728 is shown in FIG. 5C. In this embodiment, the first portion 744 is mounted transversely on the second portion 746. Preferably, the first portion 744 is a tube in which the end of the skewer is receivable, so that the end is held therein relatively securely therein.

Figure 6:
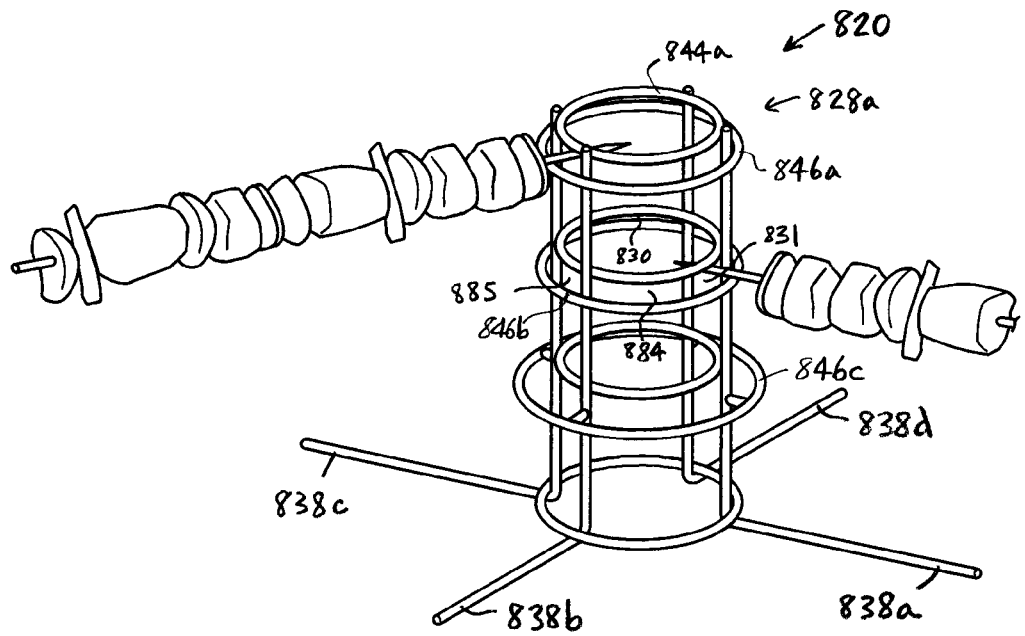
FIG. 6 is an isometric view of another embodiment of the barbecue support assembly of the invention, drawn at a smaller scale.

An alternative embodiment of the barbecue support assembly 820 is disclosed in FIG. 6. The barbecue support assembly 820 is adapted for use in a kettle style barbecue unit. As can be seen in FIG. 6, legs 838a-838d support the body element 826, which includes parts 828 positioned at preselected heights above the barbecue grill (not shown). The parts 828 include first and second portions 844, 846 at least partially defining apertures 830, 831, 884, 885 in which the ends of the skewers are receivable. Those skilled in the art will appreciate that the barbecue support assembly may also be used to support food without using skewers. For example, a whole roasting chicken (not shown) may be mounted on the barbecue support assembly 820.

Figure 7:
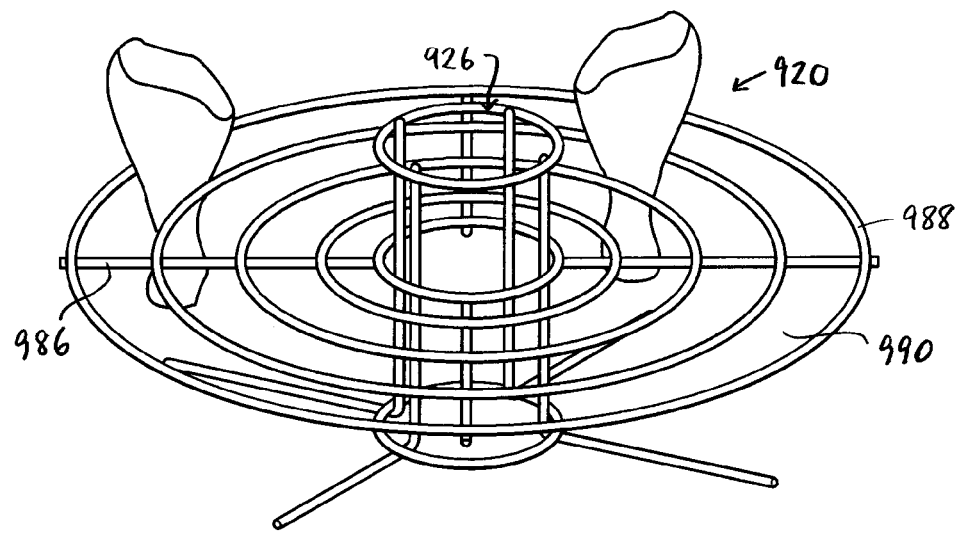
FIG. 7 is an isometric view of another alternative embodiment of the barbecue support assembly of the invention.

An alternative embodiment of the barbecue support assembly 920 is shown in FIG. 7. In this embodiment, the body element 926 and support elements 986 support concentric ring elements 988 defining spaces 990 therebetween in which the smaller end of drumsticks are receivable. Preferably, the drumsticks are positionable so that the thicker ends thereof are positioned upwardly.

Figure 8:
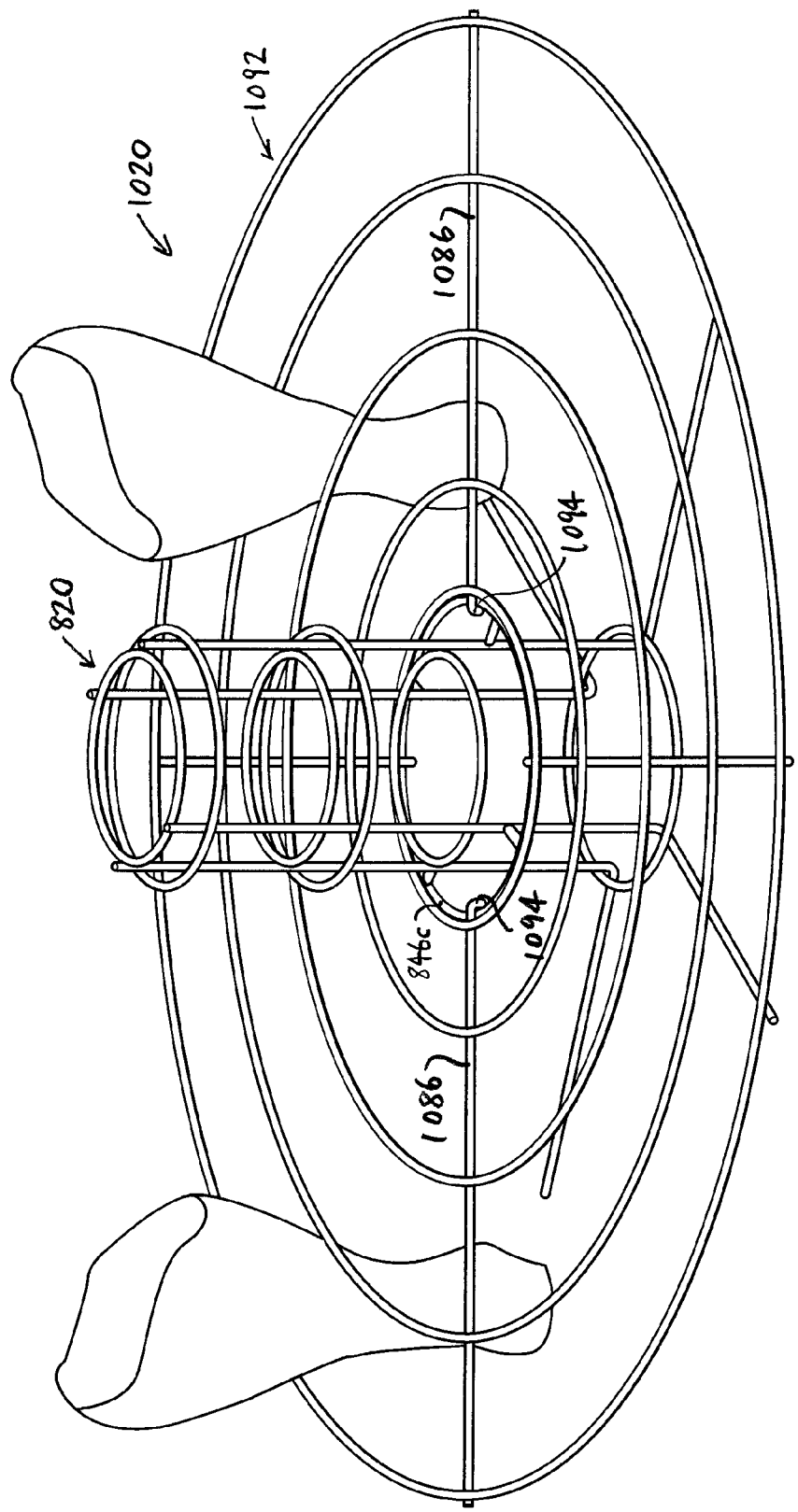
FIG. 8 is an isometric view of another embodiment of the barbecue support assembly of the invention, drawn at a larger scale.

FIG. 8 discloses a barbecue support assembly 1020 including a ring subassembly 1092 mounted on the barbecue support assembly 820. Preferably, the ring subassembly 1092 includes support elements 1086 with hook portions 1094 at inner ends thereof. The hook portions 1094 preferably are formed to engage a lowermost lower bar 846c. As can be seen in FIGS. 6 and 8, it is preferred that the lower bar 846c defines a ring with a slightly larger diameter than the rings defined by the other bars 846a, 846b in the barbecue support assembly 820. This permits the ring subassembly 1092 to be relatively easily mounted on the lowermost bar 846c. It will be understood that the ring subassembly 1092 preferably is relatively easily disengaged from the lowermost bar 846c.

It will be appreciated by those skilled in the art that the invention can take many forms, and that such forms are within the scope of the invention as claimed. The foregoing descriptions are exemplary, and their scope should not be limited to the specific versions described therein.

We claim:

1. A barbecue support assembly to support a skewer over a grill at a number of preselected vertical heights, the barbecue support assembly comprising:
    a skewer having a fixed end and a free end for holding food;
    a frame positionable on said grill having at least two spaced apart vertical uprights;
    a plurality of pairs of transverse bars, each pair of the transverse bars including a transverse upper bar extending between the two vertical uprights and attached to a back side of said uprights and a transverse lower bar extending between the two vertical uprights and attached to a front side of said uprights and attached vertically below said upper bar, wherein each pair of transverse bars is vertically spaced from each other pair of transverse bars at preselected vertical heights on said vertical members; and,
    wherein the space created by a gap between said upper and lower bars of each said pair creates an aperture to support said skewer at said preselected height above the grill, said upper bar preventing upward rotation of said fixed end of said skewer and said lower bar preventing downward rotation of said free end of said skewer, such that said free end of said skewer is cantilevered over a cooking portion of said grill.

2. The barbecue support assembly of claim 1 wherein said frame is provided with a third vertical upright aligned between said two spaced apart vertical uprights.

3. A barbecue support assembly to support a skewer over a grill at a number of preselected vertical heights, the skewer having a fixed end and a free end for holding food, said free end cantilevered over a cooking portion of said grill, the barbecue support assembly comprising:
    a frame positionable on said grill having at least two spaced apart vertical uprights;
    a plurality of pairs of transverse bars, each pair of the transverse bars including a transverse upper bar extending between the two vertical uprights and attached to a back side of said uprights and a transverse lower bar extending between the two vertical uprights and attached to a front side of said uprights and attached vertically below said upper bar, wherein each pair of transverse bars is vertically spaced from each other pair of transverse bars at preselected vertical heights on said vertical members and wherein each of said plurality of lower bars of each pair of said transverse bars include at least one notch on an upper surface thereof to stabilize said skewer; and,
    wherein the space created by a gap between said upper and lower bars of each said pair provides an aperture to accommodate said skewer at said preselected height above the grill, said upper bar preventing upward rotation of said fixed end of said skewer and said lower bar preventing downward rotation of said free end of said skewer.

4. A rack assembly to support a skewer at a fixed end, the skewer also having a free end cantilevered above the cooking area of a grill, comprising:
    a frame positionable on said grill having at least two spaced apart upstanding vertical members;
    a plurality of transverse bars extending between the two vertical members and each transverse bar attached to each of said vertical members, and wherein each transverse bar is vertically spaced from each other at various heights on said vertical members;
    at least one tubular member having an opening associated with each said transverse bar, each said tubular member attached with said opening in perpendicular relationship directly to said transverse bar, the fixed end of said skewer capable of being inserted into said opening and engaged by said tubular member such that the free end of the skewer is supported above the cooking area of the grill.

5. The rack assembly of claim 4 including a plurality of tubular members attached to each of said transverse bars.

6. A barbecue support assembly to support a food retention rack over a grill at a preselected height, the barbecue support assembly comprising:
    a food retention rack having a fixed end and a free end for holding or supporting food;
    a frame positionable on said grill having at least two spaced apart vertical uprights;
    at least one transverse upper bar extending between the two vertical uprights and attached to a back side of said uprights;
    at least one transverse lower bar extending between the two vertical uprights and attached to a front side of said uprights;
    said lower bar attached vertically below said upper bar, wherein the space created by a gap between said upper and lower bars which creates an aperture to support said food retention rack at said preselected height above the grill, said upper bar preventing upward rotation of said fixed end of said food retention rack and said lower bar preventing downward rotation of said free end of said food retention rack such that said free end of said food retention device is cantilevered over a cooking portion of said grill.

7. The barbecue support assembly of claim 6 wherein a plurality of pairs of transverse lower bars and transverse upper bars are provided with each pair attached at preselected vertical heights along said vertical uprights to support said food retention rack at a variety of heights above said grill.

8. The barbecue support assembly of claim 6 wherein said frame is provided with a third vertical upright aligned between said two spaced apart vertical uprights.

9. The barbecue support assembly of claim 1 wherein each of said plurality of lower bars of each pair of said transverse bars include at least one notch on an upper surface thereof to stabilize said skewer.

\* \* \* \* \*